(12) United States Patent
Fan et al.

(10) Patent No.: US 12,038,155 B1
(45) Date of Patent: Jul. 16, 2024

(54) PLUG-IN SENSING DEVICE AND LAMP

(71) Applicant: Signcomplex Limited, Shenzhen (CN)

(72) Inventors: Shuxing Fan, Shenzhen (CN); Meiming Zhou, Ji'an (CN); Tiejun Wu, Shenzhen (CN)

( * ) Notice: Subject to any disclaimer, the term of this patent is extended or adjusted under 35 U.S.C. 154(b) by 0 days.

(21) Appl. No.: 18/600,752

(22) Filed: Mar. 10, 2024

(30) Foreign Application Priority Data

Feb. 6, 2024 (CN) .......................... 202420288417.1

(51) Int. Cl.
*F21V 17/16* (2006.01)
*F16B 2/12* (2006.01)
(Continued)

(52) U.S. Cl.
CPC ........ *F21V 17/164* (2013.01); *F21V 23/0471* (2013.01); *F16B 2/12* (2013.01); *F21S 4/00* (2013.01); *F21S 4/20* (2016.01); *F21S 4/22* (2016.01); *F21S 4/24* (2016.01); *F21S 4/26* (2016.01); *F21S 4/28* (2016.01); *F21V 21/088* (2013.01); *F21V 21/0885* (2013.01); *F21V 23/0442* (2013.01); *F21V 23/045* (2013.01); *F21V 23/0457* (2013.01); *F21V 23/0464* (2013.01); *F21V 23/0478* (2013.01);
(Continued)

(58) Field of Classification Search
CPC ............... F21V 23/0442; F21V 23/045; F21V 23/0457; F21V 23/0464; F21V 23/0471; F21V 23/0478; F21V 23/0485; F21V 23/0492; F21V 21/088; F21V 21/0885; F16B 2/12; F21S 4/00; F21S 4/20; F21S 4/22; F21S 4/24; F21S 4/26; F21S 4/28; G01J 5/047

USPC ......................................... 248/231.41, 231.61
See application file for complete search history.

(56) References Cited

U.S. PATENT DOCUMENTS 4,491,902 A * 1/1985 Cangelosi ................. F21S 4/10
362/396
9,400,216 B2 * 7/2016 Mans ....................... G01J 5/047
(Continued)

FOREIGN PATENT DOCUMENTS

WO WO-0229259 A1 * 4/2002 ........... A47B 96/065

*Primary Examiner* — Colin J Cattanach

(57) ABSTRACT

The present application provides a plug-in sensing device and a lamp. The plug-in sensing device comprises: a base, the base being provided with a first snap-fit fastener, and the first snap-fit fastener being used for snap-fitting with a lower edge of a lamp body so as to connect the base and the lamp body together; a cover, the cover covering the base and defining a limiting cavity together with the base; a sensor, at least part of the sensor being disposed in the limiting cavity, and a sensing portion on the sensor being exposed outside the limiting cavity; and a connecting seat, the connecting seat being disposed between the base and the cover, the connecting seat being provided with a second snap-fit fastener, and the second snap-fit fastener being used for snap-fitting with an upper edge of the lamp body so as to connect the connecting seat and the lamp body together. According to the present application, a user can optionally choose whether to mount the sensor, and thus different usage needs can be met. Furthermore, since the first snap-fit fastener, the second snap-fit fastener and the lamp body are connected, the costs can be reduced without improving an original structure of the lamp body.

10 Claims, 6 Drawing Sheets

(51) Int. Cl.
*F21S 4/00* (2016.01)
*F21S 4/20* (2016.01)
*F21S 4/22* (2016.01)
*F21S 4/24* (2016.01)
*F21S 4/26* (2016.01)
*F21S 4/28* (2016.01)
*F21V 21/088* (2006.01)
*F21V 23/04* (2006.01)
*G01J 5/04* (2006.01)

(52) U.S. Cl.
CPC ....... *F21V 23/0485* (2013.01); *F21V 23/0492* (2013.01); *G01J 5/047* (2013.01)

(56) References Cited

U.S. PATENT DOCUMENTS

| | | | | |
|---|---|---|---|---|
| 10,798,797 | B1* | 10/2020 | Mahaffey | H05B 47/115 |
| 2009/0141499 | A1* | 6/2009 | Fabbri | F21S 8/046 |
| | | | | 362/276 |
| 2015/0138784 | A1* | 5/2015 | Pratt | F21V 23/0464 |
| | | | | 362/373 |
| 2018/0003561 | A1* | 1/2018 | Coombes | G01J 1/0403 |

\* cited by examiner

PLUG-IN SENSING DEVICE AND LAMP

TECHNICAL FIELD

The present application relates to a sensing device, and in particular to a plug-in sensing device and a lamp.

BACKGROUND ART

In the technical field of lamps, some lamps are provided with human body sensors in order to achieve smart switching on and off of the lamps. The human body sensors are mounted by forming holes in the fronts of lampshades or shortening luminous bodies, and such a mounting method requires that securing and assembly have been completed at the factory, so that users cannot optionally choose whether to mount the human body sensors according to actual needs and thus different usage needs cannot be met.

SUMMARY

Embodiments of the present application provide a plug-in sensing device and a lamp in order to solve the problems existing in related art. A technical solution thereof is described as follows.

In a first aspect, an embodiment of the present application provides a plug-in sensing device, comprising:
- a base, the base being provided with a first snap-fit fastener, and the first snap-fit fastener being used for snap-fitting with a lower edge of a lamp body so as to connect the base and the lamp body together;
- a cover, the cover covering the base and defining a limiting cavity together with the base;
- a sensor, at least part of the sensor being disposed in the limiting cavity, and a sensing portion on the sensor being exposed outside the limiting cavity; and
- a connecting seat, the connecting seat being disposed between the base and the cover, the connecting seat being provided with a second snap-fit fastener, and the second snap-fit fastener being used for snap-fitting with an upper edge of the lamp body so as to connect the connecting seat and the lamp body together.

In an implementation, the connecting seat is movably disposed between the base and the cover such that a distance between the first snap-fit fastener and the second snap-fit fastener is adjustable.

In an implementation, the connecting seat is movably disposed on the base.

In an implementation, a plurality of toothed protrusions are disposed on the base, and the plurality of toothed protrusions are arranged in sequence in a vertical direction; a plurality of toothed grooves are disposed on the connecting seat, the plurality of toothed grooves are arranged in sequence in the vertical direction, the number of the toothed grooves is greater than the number of the toothed protrusions, and each toothed protrusion matches the corresponding toothed groove to restrict an upward movement of the connecting seat; and when the connecting seat is pressed down, the toothed groove is switched to match another toothed protrusion as the connecting seat moves.

In an implementation, one of the base and the cover is provided with slots, the other is provided with catches, and the catches and the slots are snap-fitted to connect the base and the cover together.

In an implementation, the base and the cover are connected together in a detachable manner.

In an implementation, a first extension portion extending in the vertical direction is disposed on the base; and
the cover is provided with a second extension portion extending in the vertical direction, the second extension portion and the first extension portion are disposed opposite to each other and define a limiting groove, and the limiting groove accommodates at least part of the connecting seat.

In an implementation, the first snap-fit fastener comprises:
- a first connecting portion, the first connecting portion being connected to the base, and the first connecting portion extending in a lateral direction; and
- a second connecting portion, the lower end of the second connecting portion being connected to an end of the first connecting portion away from the base, and the upper end of the second connecting portion extending upward relative to the first connecting portion.

In an implementation, the second snap-fit fastener comprises:
- a third connecting portion, the third connecting portion being connected to the connecting seat, and the third connecting portion extending in a lateral direction; and
- a fourth connecting portion, the upper end of the fourth connecting portion being connected to an end of the third connecting portion away from the connecting seat, and the lower end of the fourth connecting portion extending downward relative to the third connecting portion.

In an implementation, one of the base and the cover is provided with slots, the other is provided with catches, and the catches and the slots are snap-fitted to connect the base and the cover together.

In an implementation, an avoidance opening is formed in the bottom of the base, and if the base is mounted on the lamp body, the avoidance opening faces down, the avoidance opening is in communication with the limiting cavity, and the avoidance opening allows the sensing portion of the sensor to be exposed outside the limiting cavity.

In a second aspect, an embodiment of the present application provides a lamp, comprising a lamp body and the above-mentioned plug-in sensing device.

The advantages or beneficial effects of the above technical solution include at least as follows:
the plug-in sensing device of the present disclosure can be mounted outside the lamp body by snap-fitting the first snap-fit fastener with the lower edge of the lamp body and snap-fitting the second snap-fit fastener with the upper edge of the lamp body, so that the plug-in sensing device is convenient and fast to mount, can be detached from the lamp body, and has the advantages of being convenient, fast and free to mount and detach. Therefore, a user can optionally choose whether to mount the sensor, and thus different usage needs can be met. In addition, since the first snap-fit fastener, the second snap-fit fastener and the lamp body are connected, the costs can be reduced without improving an original structure of the lamp body, and it is more conducive to the popularization and application of the plug-in sensing device.

Since the lamp of the present disclosure uses the plug-in sensing device in any one of the embodiments described above, the user can similarly optionally choose whether to mount the sensor, and thus different usage needs can be met. Furthermore, since the first snap-fit fastener, the second snap-fit fastener and the lamp body are connected, the costs can be reduced without improving the original structure of the lamp body.

The above description is merely presented for the purpose of illustration, and is not intended to limit the present disclosure in any way. Except for the above illustrative aspects, implementations and features, further aspects, implementations and features of the present application will become readily apparent with reference to the accompanying drawings and the following detailed description.

BRIEF DESCRIPTION OF THE DRAWINGS

In figures, the same reference numerals denote the same or similar components or elements throughout a plurality of figures unless otherwise specified. These figures are not necessarily drawn to scale. It should be understood that these figures depict only some implementations disclosed according to the present application and are not to be construed as limiting the scope of the present application.

LIST OF REFERENCE NUMERALS

Figure 1:
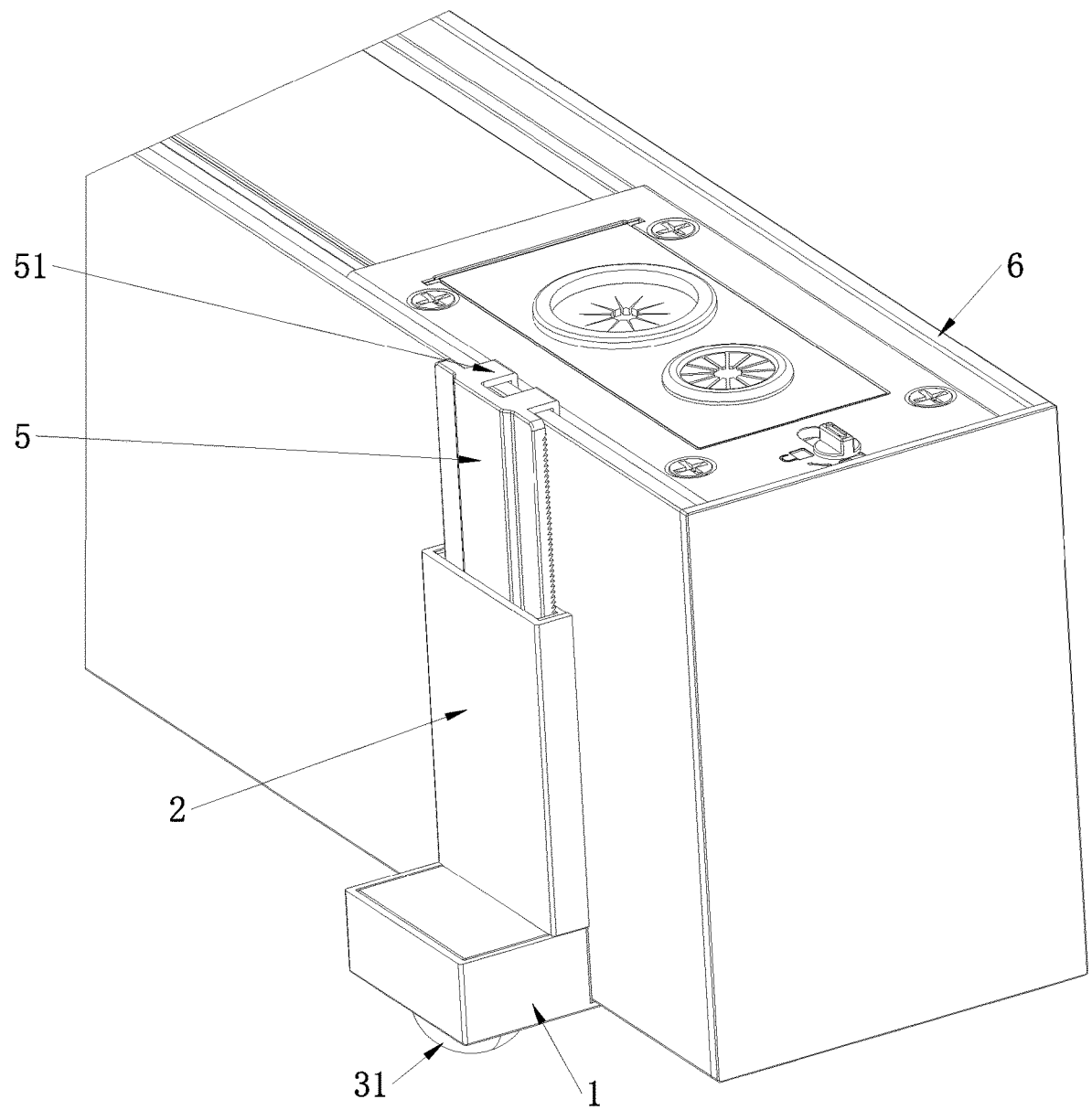
FIG. 1 is a schematic perspective structural diagram of a plug-in sensing device mounted on a lamp body according to the present disclosure.

1. Base; 11. First snap-fit fastener; 111. First connecting portion; 112. Second connecting portion; 12. Toothed protrusion; 13. First extension portion; 14. Catch; 15. Avoidance opening; 2. Cover; 21. Second extension portion; 22. Slot; 3. Sensor; 31. Sensing portion; 32. Wire; 4. Limiting cavity; 5. Connecting seat; 51. Second snap-fit fastener; 511. Third connecting portion; 512. Fourth connecting portion; 52. Toothed groove; 6. Lamp body; 61. Lower edge; 62. Upper edge; and 7. Limiting groove.

DETAILED DESCRIPTION OF EMBODIMENTS

Only some exemplary embodiments are briefly described below. As can be appreciated by those skilled in the art, modifications may be made to the described embodiments in various ways without departing from the spirit or scope of the present application. Therefore, the accompanying drawings and the description are considered as exemplary in nature rather than limiting.

FIGS. 1 to 6 illustrate a plug-in sensing device according to a preferred implementation of the present disclosure. The plug-in sensing device comprises:

a base 1, the base 1 being provided with a first snap-fit fastener 11, and the first snap-fit fastener 11 being used for snap-fitting with a lower edge 61 of a lamp body 6 so as to connect the base 1 and the lamp body 6 together;

a cover 2, the cover 2 covering the base 1 and defining a limiting cavity 4 together with the base 1;

a sensor 3, at least part of the sensor 3 being disposed in the limiting cavity 4, and a sensing portion 31 on the sensor 3 being exposed outside the limiting cavity 4; and a connecting seat 5, the connecting seat 5 being disposed between the base 1 and the cover 2, the connecting seat 5 being provided with a second snap-fit fastener 51, and the second snap-fit fastener 51 being used for snap-fitting with an upper edge 62 of the lamp body 6 so as to connect the connecting seat 5 and the lamp body 6 together.

The plug-in sensing device of the present disclosure can be mounted outside the lamp body 6 by snap-fitting the first snap-fit fastener 11 with the lower edge 61 of the lamp body 6 and snap-fitting the second snap-fit fastener 51 with the upper edge 62 of the lamp body 6, so that the plug-in sensing device is convenient and fast to mount, can be detached from the lamp body 6, and has the advantages of being convenient, fast and free to mount and detach. Therefore, a user can optionally choose whether to mount the sensor 3, and thus different usage needs can be met. In addition, since the first snap-fit fastener 11, the second snap-fit fastener 51 and the lamp body 6 are connected, the costs can be reduced without improving an original structure of the lamp body 6, and it is more conducive to the popularization and application of the plug-in sensing device.

In an implementation, the connecting seat 5 is movably disposed between the base 1 and the cover 2 such that a distance between the first snap-fit fastener 11 and the second snap-fit fastener 51 is adjustable, thus allowing the user to adjust the distance between the first snap-fit fastener 11 and the second snap-fit fastener 51 to a required size according to the height of the mounted lamp body 6, and the plug-in sensing device can accordingly be applied to the lamp bodies 6 of different sizes and is versatile, thereby reducing the costs.

In an implementation, the connecting seat 5 is movably disposed on the base 1, that is, the connecting seat 5 and the base 1 are movably connected together, and the connecting seat 5 is disposed on the base 1 because a rear side surface of the base 1 can be tightly attached to an outer side surface of the lamp body 6 during mounting, so that the movement stability of the connecting seat 5 can be improved, and the structural reliability is higher.

Of course, in other implementations, the connecting seat 5 may also be disposed on the cover 2.

Referring to FIGS. 2 to 6, in an implementation, a plurality of toothed protrusions 12 are disposed on the base 1, and the plurality of toothed protrusions 12 are arranged in sequence in a vertical direction.

A plurality of toothed grooves 52 are disposed on the connecting seat 5, the plurality of toothed grooves 52 are arranged in sequence in the vertical direction, the number of the toothed grooves 52 is greater than the number of the toothed protrusions 12, and each toothed protrusion 12 matches the corresponding toothed groove 52 to restrict an upward movement of the connecting seat 5, thereby preventing the connecting seat 5 from detaching from the base 1.

Also, when the connecting seat 5 is pressed down, the toothed groove 52 is switched to match another toothed protrusion 12 as the connecting seat 5 moves, so as to shorten the distance between the first snap-fit fastener 11 and the second snap-fit fastener 51. In this way, during mounting, the first snap-fit fastener 11 is snap-fitted with the lower edge 61 of the lamp body 6, the second snap-fit fastener 51 is located directly above the upper edge 62 of the lamp body 6, and then the connecting seat 5 is pressed downward according to the height of the lamp body 6, such that the distance between the first snap-fit fastener 11 and the second snap-fit fastener 51 is equal to the height of the lamp body 6, and later, the second snap-fit fastener 51 is snap-fitted with the upper edge 62 of the lamp body 6 such that the plug-in sensing device in this embodiment can be mounted on the lamp body 6. The structure is simple and practical, and the connecting reliability is high. In addition, by means of the cooperation between the toothed protrusions 12 and the toothed grooves 52, it is possible to ensure that the connecting seat 5 is movable relative to the base 1, and it is also possible to play the effect of restricting the upward detachment of the connecting seat 5 from the base 1, so that the structure is further simplified, and the costs can further be reduced while the mounting is facilitated.

In an implementation, the toothed protrusions 12 may be disposed on the connecting seat 5, and correspondingly, the toothed grooves 52 may be disposed on the base 1.

In other implementations, the connecting seat 5 and the base 1 may also be connected together by means of a telescopic structure, such that the connecting seat 5 can move up and down relative to the base 1.

In an implementation, the base 1 and the cover 2 are connected together in a detachable manner to facilitate repeated mounting and detaching of the connecting seat 5. In this way, when the distance between the first snap-fit fastener 11 and the second snap-fit fastener 51 need to be increased, the cover 2 may be detached first, and the relative position of the connecting seat 5 and the base 1 is then adjusted, which further facilitates the mounting of the plug-in sensing device.

Figure 5:
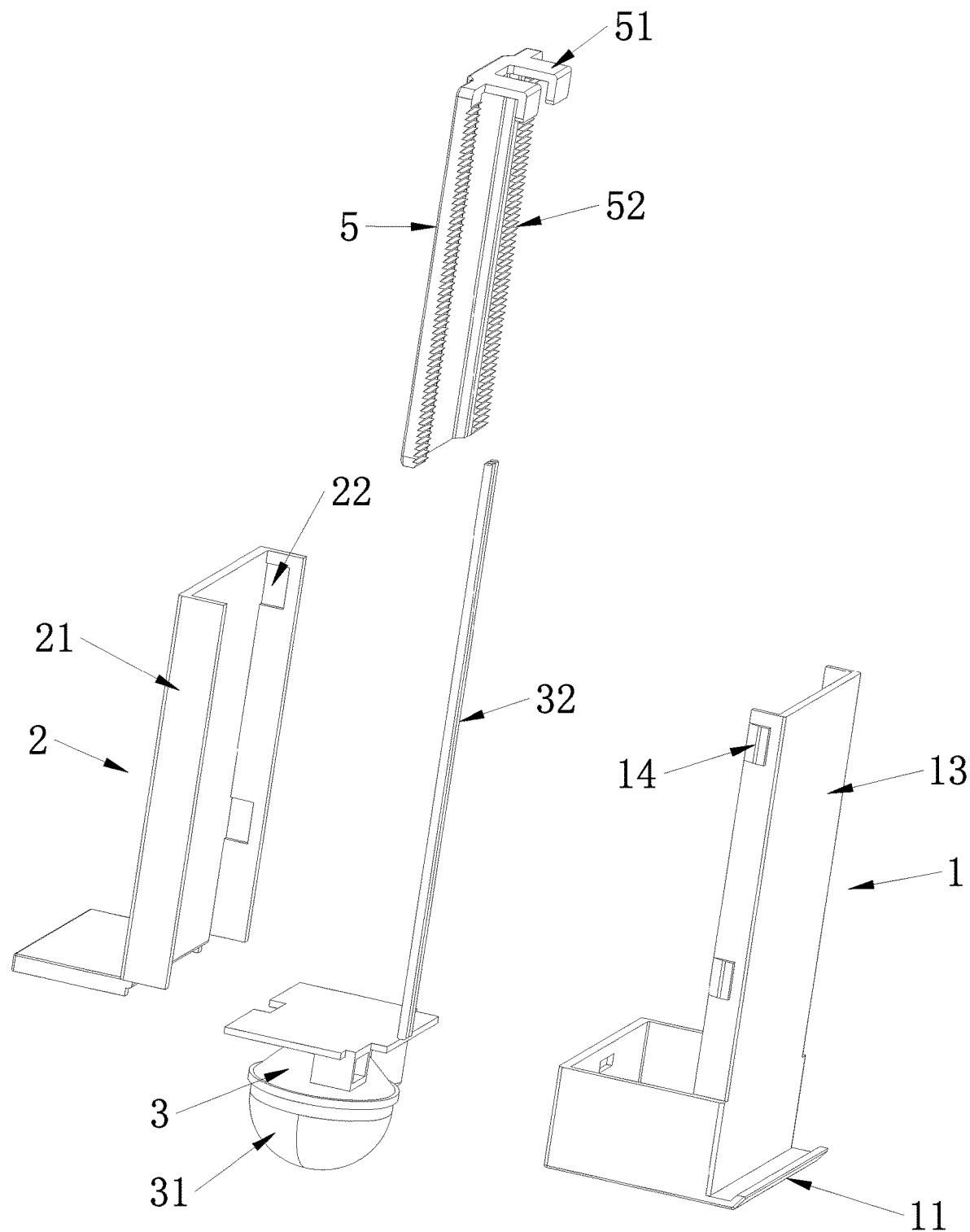
FIG. 5 is an exploded view of the plug-in sensing device according to the present disclosure from a first perspective.
Figure 6:
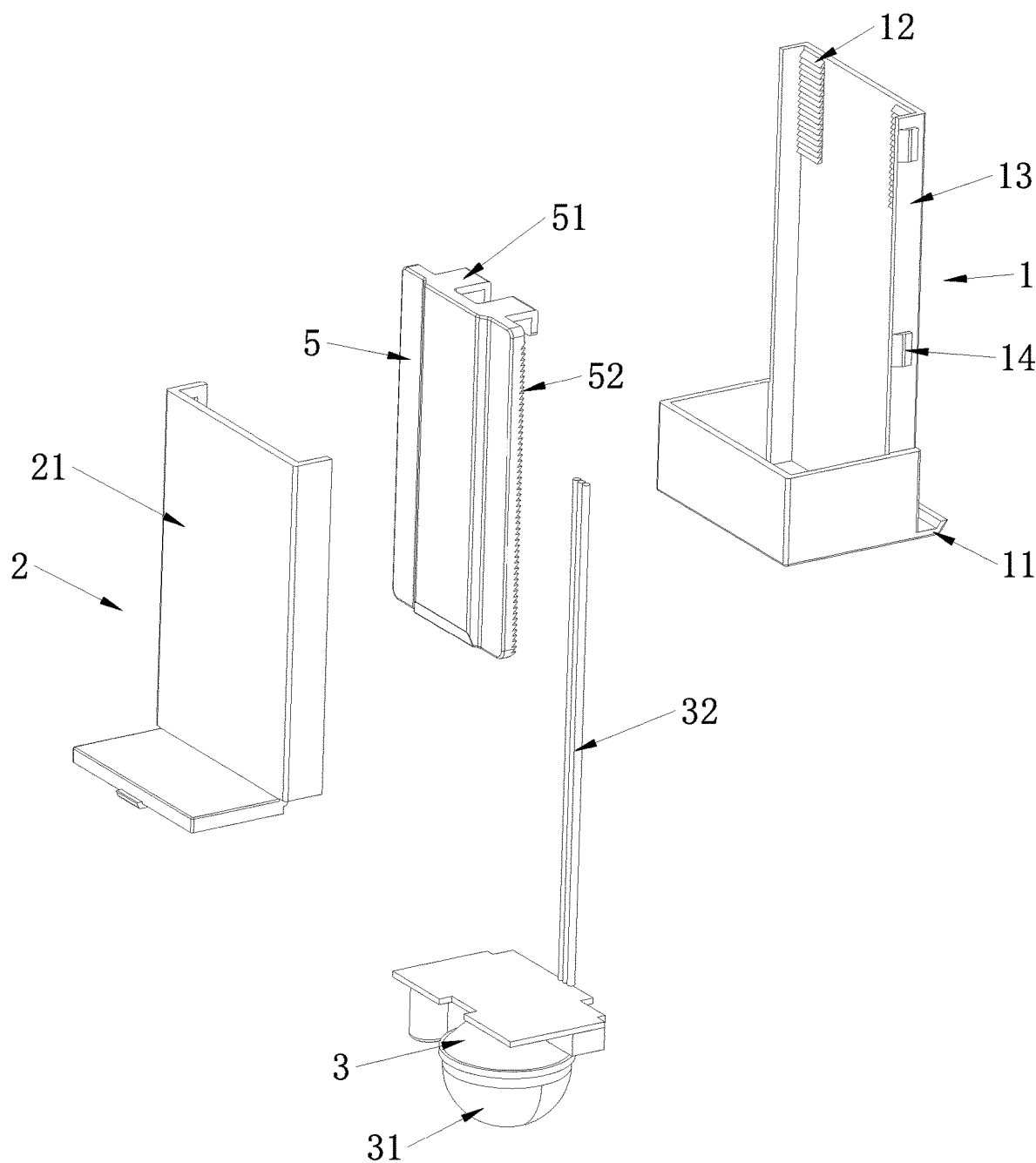
FIG. 6 is an exploded view of the plug-in sensing device according to the present disclosure from a second perspective.

Referring to FIGS. 5 and 6, in an implementation, one of the base 1 and the cover 2 is provided with slots 22, the other is provided with catches 14, and the catches 14 and the slots 22 are snap-fitted to connect the base 1 and the cover 2 together, so that the base 1 and the cover 2 can be quickly mounted or detached, thus facilitating repeated mounting and detaching of the connecting seat 5. Meanwhile, detachable connecting structures formed by the catches 14 and the slots 22 are simple and practical, are high in connecting reliability and low in cost, and can be mounted or detached without a tool, and thus the costs of the plug-in sensing device can be reduced.

In other implementations, the base 1 and the cover 2 may also be connected together by means of detachable connecting structures such as screws, bolts, magnetic structures, etc.

In an implementation, a first extension portion 13 extending in the vertical direction is disposed on the base 1.

The cover 2 is provided with a second extension portion 21 extending in the vertical direction, the second extension portion 21 and the first extension portion 13 are disposed opposite to each other and define a limiting groove 7, and the limiting groove 7 accommodates at least part of the connecting seat 5 to limit a lateral movement of the connecting seat 5, so that the reliable mounting of the connecting seat 5 between the base 1 and the cover 2 is ensured, and the structural reliability is higher.

Figure 3:
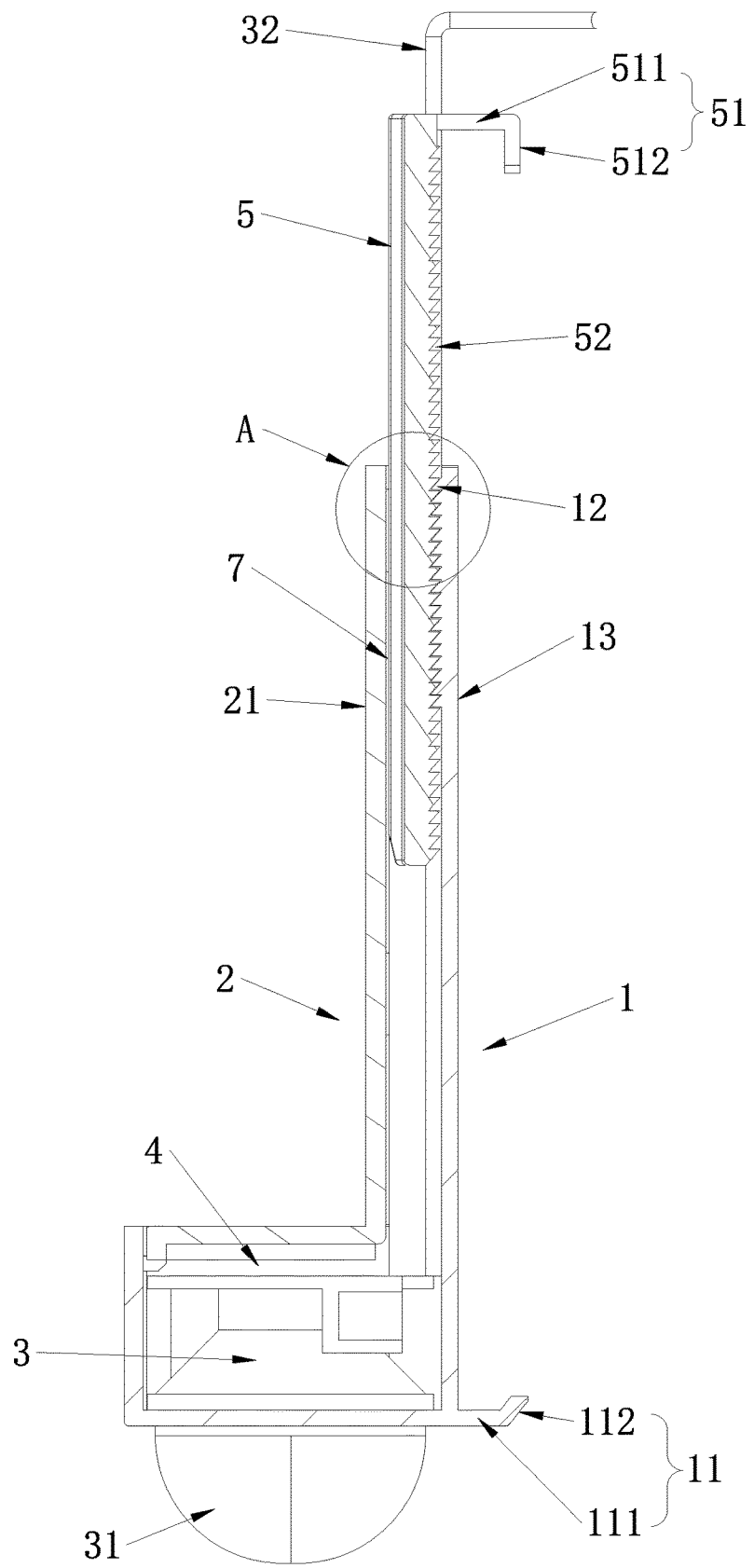
FIG. 3 is a cross-sectional view of the plug-in sensing device according to the present disclosure.
Figure 4:
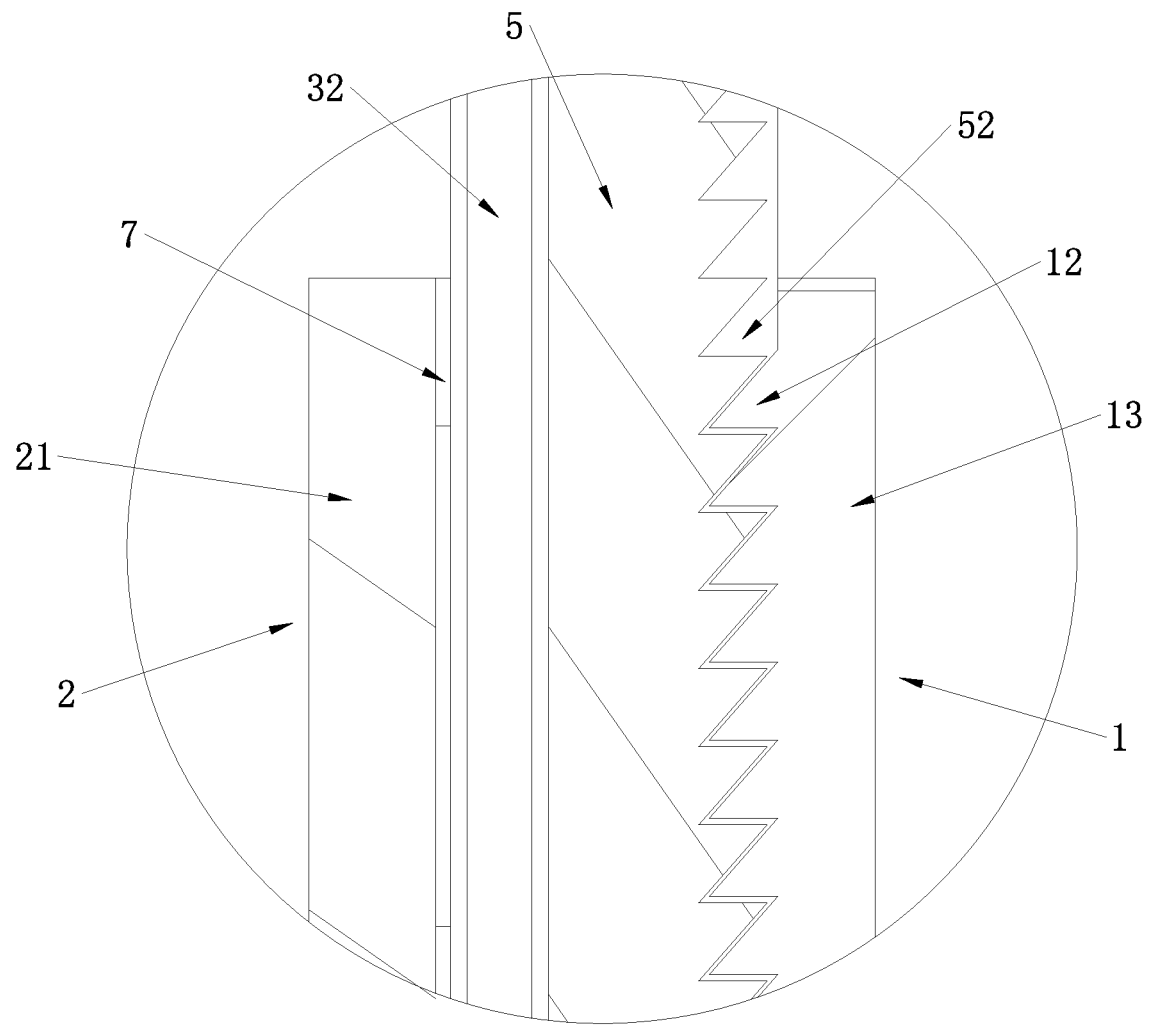
FIG. 4 is a partial enlarged view of part A in FIG. 3.

Referring to FIG. 3, in an implementation, in order to improve the connecting reliability between the first snap-fit fastener 11 and the lower edge 61 of the lamp body 6, the first snap-fit fastener 11 comprises:
  a first connecting portion 111, the first connecting portion 111 being connected to the base 1, and the first connecting portion 111 extending in a lateral direction; and
  a second connecting portion 112, the lower end of the second connecting portion 112 being connected to an end of the first connecting portion 111 away from the base 1, and the upper end of the second connecting portion 112 extending upward relative to the first connecting portion 111.

Referring to FIG. 3, in an implementation, in order to improve the connecting reliability between the second snap-fit fastener 51 and the upper edge 62 of the lamp body 6, the second snap-fit fastener 51 comprises:
  a third connecting portion 511, the third connecting portion 511 being connected to the connecting seat 5, and the third connecting portion 511 extending in a lateral direction; and
  a fourth connecting portion 512, the upper end of the fourth connecting portion 512 being connected to an end of the third connecting portion 511 away from the connecting seat 5, and the lower end of the fourth connecting portion 512 extending downward relative to the third connecting portion 511.

Figure 2:
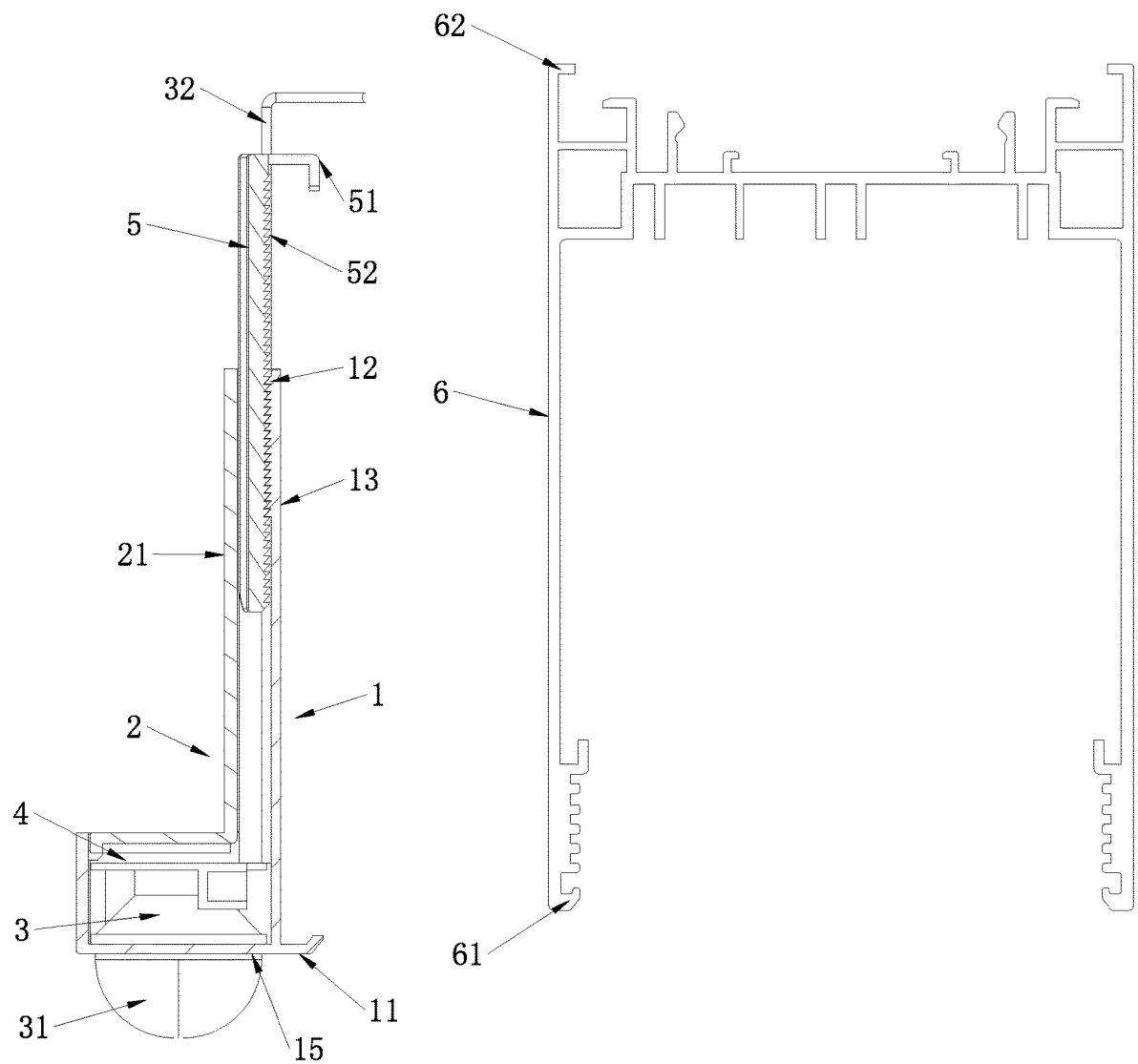
FIG. 2 is an exploded view of the plug-in sensing device and the lamp body according to the present disclosure.

Referring to FIG. 2, in an implementation, an avoidance opening 15 is formed in the bottom of the base 1, and if the base 1 is mounted on the lamp body 6, the avoidance opening 15 faces down, the avoidance opening 15 is in communication with the limiting cavity 4, and the avoidance opening 15 allows the sensing portion 31 of the sensor 3 to be exposed outside the limiting cavity 4. In this way, the sensing portion 31 is also allowed to face down, so that the sensing portion 31 conveniently senses a human body or other objects, thus the sensing sensitivity can be improved, and the structural reliability is higher.

In an implementation, a wire 32 is further disposed on the sensor 3, the wire 32 passes upward out of the limiting groove 7, and the wire 32 is used for electrically connecting to a circuit board in the lamp body 6, such that the sensor 3 and the lamp body 6 are electrically connected together.

A preferred implementation of the present disclosure provides a lamp, comprising a lamp body 6 and the above-mentioned plug-in sensing device.

Since the lamp of the present disclosure uses the plug-in sensing device in any one of the embodiments described above, the user can similarly optionally choose whether to mount the sensor 3, and thus different usage needs can be met. Furthermore, since the first snap-fit fastener 11, the second snap-fit fastener 51 and the lamp body 6 are connected, the costs can be reduced without improving the original structure of the lamp body 6.

In the description of this specification, descriptions with reference to the terms such as "an embodiment", "some embodiments", "example", "specific example", or "some examples" mean that specific features, structures, materials, or characteristics described with reference to the embodiment or example are included in at least one embodiment or example of the present application. Moreover, the specific features, structures, materials or characteristics described can be combined in any one or more embodiments or examples in any suitable manner. In addition, without any contradiction, a person skilled in the art may bind and combine different embodiments or examples and features of the different embodiments or examples in the specification.

In addition, the terms "first" and "second" are used for descriptive purposes only, and cannot be construed as indicating or implying relative importance or implicitly indicating the number of technical features indicated. Thus, the features defined with "first" and "second" may explicitly or implicitly include at least one of the features. In the description of the present application, the meaning of "a plurality of" is two or more, unless explicitly and specifically defined otherwise.

The above descriptions are merely specific implementations of the present application, but are not intended to limit the scope of protection of the present application. Any variation or replacement readily figured out by those skilled in the art within the technical scope disclosed in the present application shall fall within the scope of protection of the present application. Therefore, the scope of protection of the present application shall be subject to the scope of protection of the claims.

What is claimed is:

1. A plug-in sensing device, comprising:
a base, the base being provided with a first snap-fit fastener, and the first snap-fit fastener being used for snap-fitting with a lower edge of a lamp body so as to connect the base and the lamp body together;
a cover, the cover covering the base and defining a limiting cavity together with the base;
a sensor, at least part of the sensor being disposed in the limiting cavity, and a sensing portion on the sensor being exposed outside the limiting cavity; and
a connecting seat, the connecting seat being disposed between the base and the cover, the connecting seat being provided with a second snap-fit fastener, and the second snap-fit fastener being used for snap-fitting with an upper edge of the lamp body so as to connect the connecting seat and the lamp body together.

2. The plug-in sensing device according to claim 1, wherein the connecting seat is movably disposed between the base and the cover such that a distance between the first snap-fit fastener and the second snap-fit fastener is adjustable.

3. The plug-in sensing device according to claim 2, wherein the connecting seat is movably disposed on the base.

4. The plug-in sensing device according to claim 3, wherein a plurality of toothed protrusions are disposed on the base, and the plurality of toothed protrusions are arranged in sequence in a vertical direction;
a plurality of toothed grooves are disposed on the connecting seat, the plurality of toothed grooves are arranged in sequence in the vertical direction, the number of the toothed grooves is greater than the number of the toothed protrusions, and each toothed protrusion matches the corresponding toothed groove to restrict an upward movement of the connecting seat;
and when the connecting seat is pressed down, the toothed groove is switched to match another toothed protrusion as the connecting seat moves.

5. The plug-in sensing device according to claim 4, wherein one of the base and the cover is provided with slots, the other is provided with catches, and the catches and the slots are snap-fitted to connect the base and the cover together.

6. The plug-in sensing device according to claim 1, wherein the base and the cover are connected together in a detachable manner.

7. The plug-in sensing device according to claim 1, wherein the first snap-fit fastener comprises:
a first connecting portion, the first connecting portion being connected to the base, and the first connecting portion extending in a lateral direction; and
a second connecting portion, the lower end of the second connecting portion being connected to an end of the first connecting portion away from the base, and the upper end of the second connecting portion extending upward relative to the first connecting portion.

8. The plug-in sensing device according to claim 1, wherein the second snap-fit fastener comprises:
a third connecting portion, the third connecting portion being connected to the connecting seat, and the third connecting portion extending in a lateral direction; and
a fourth connecting portion, the upper end of the fourth connecting portion being connected to an end of the third connecting portion away from the connecting seat, and the lower end of the fourth connecting portion extending downward relative to the third connecting portion.

9. The plug-in sensing device according to claim 1, wherein an avoidance opening is formed in the bottom of the base, and if the base is mounted on the lamp body, the avoidance opening faces down, the avoidance opening is in communication with the limiting cavity, and the avoidance opening allows the sensing portion of the sensor to be exposed outside the limiting cavity.

10. A lamp, comprising a lamp body and a plug-in sensing device according to claim 1.

* * * * *